F. B. Smith,
Lifting Jack,
No 11,303. Patented July 11, 1854.
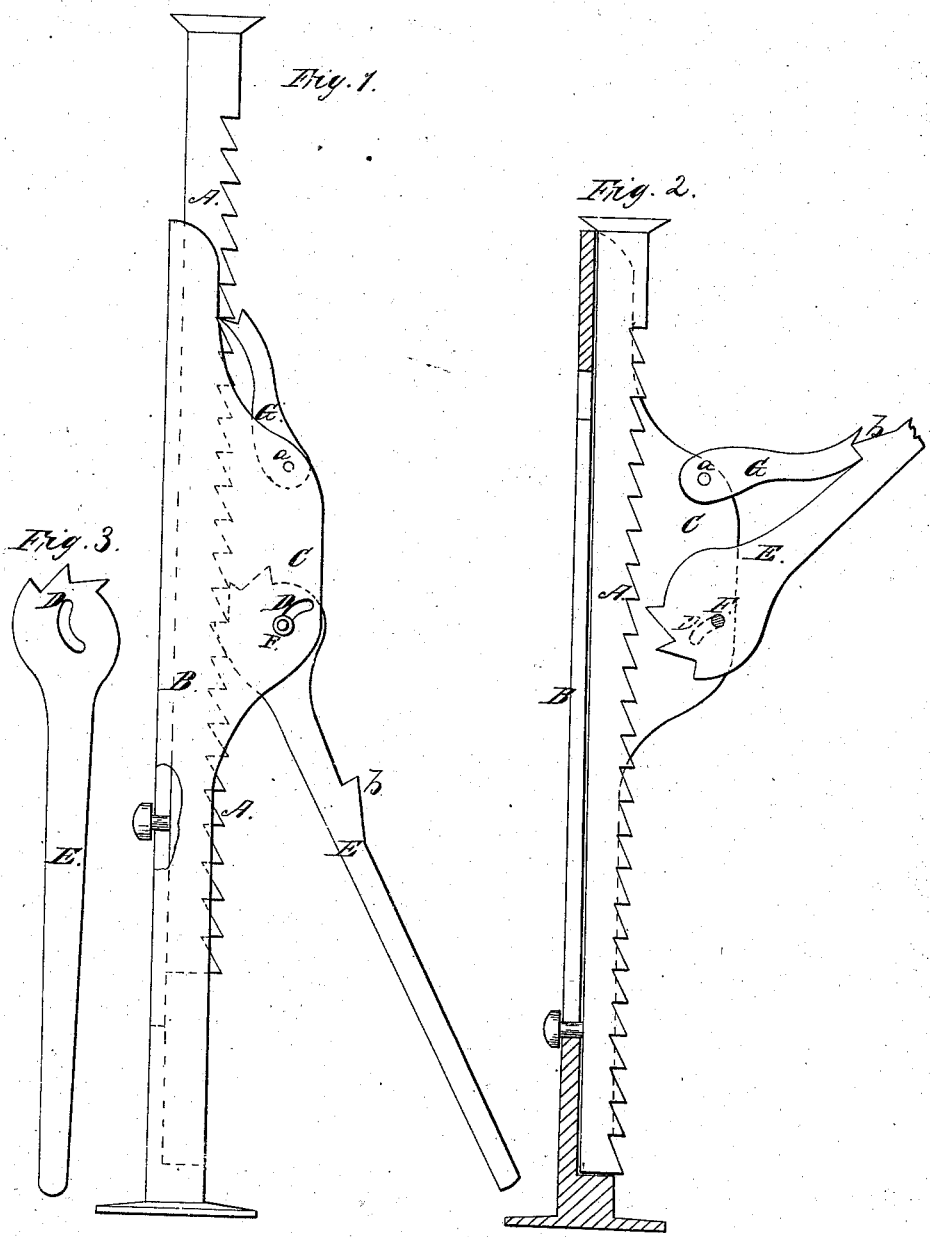

UNITED STATES PATENT OFFICE.

F. B. SMITH, OF CRAIGSVILLE, NEW YORK.

LIFTING-JACK.

Specification of Letters Patent No. 11,303, dated July 11, 1854.

*To all whom it may concern:*

Be it known that I, F. B. SMITH, of Craigsville, in the county of Orange and State of New York, have invented a new and useful Improvement in Lifting-Jacks; and I do hereby declare that the following is a full, clear, and exact description of the same, reference being had to the accompanying drawing, forming part of this specification, in which—

Figure 1, is a side elevation of a lifting jack, with my improvements applied to it. Fig. 2, is a vertical transverse section of the same. Fig. 3, shows a modification of my invention, it representing a side elevation of the lifting lever with the curved adjusting slot formed in it, instead of in the bearings of the standard.

Similar letters of reference in each of the several figures indicate corresponding parts.

The nature of my invention consists in forming a curved oblong slot in each of the ears cast on the standard or guide frame, in combination with a double acting pawl, said slots serving for the fulcrum of the lifting lever to turn in, while the rack bar is being elevated, and also allowing the fulcrum of the lifting lever to have sufficient play to admit of the teeth of the lifting lever being moved out of contact with the teeth of said bar; and the double acting pawl serving, when not in use for preventing the rack bar falling, and the said lever is moved out of contact with the rack bar and its fulcrum caused to occupy a position in the upper part of the curved stop, to prevent all possibility of the said fulcrum slipping down to the bottom of the slot, and thereby allowing the lever to again come in contact with the rack bar while descending.

To enable others skilled in the art to make and use my invention, I will proceed to describe its construction and operation more minutely.

A, represents the rack bar.

B, is the standard or guide frame, in which said bar slides up and down.

C, designates the ears cast on the standard, B.

D, represents the curved slots formed in ears, C.

E, is the lifting lever, and F, the fulcrum of the same. The fulcrum pin, F, is secured fast in the lever, and turns in the lower part of the curved slots, D, when the lever is in proper position, as shown in Fig. 1, for elevating the bar; it also plays freely in said slots, and is capable of assuming a position in the upper part of the same when the lever is adjusted, as shown in Fig. 2, so as to allow the rack bar to fall.

G, is the double acting pawl; it occupies a position in front, and near the top of the rack bar, and turns on a pin, $a$, which passes through the ears, C. This pawl has its end so shaped or notched, as seen in the drawing, that it serves the purpose of an ordinary pawl, when in the position shown in Fig. 1; and, in combination with the tooth, $b$, on the lever, as a stop to prevent the fulcrum of the lever falling to the bottom of the slot, and the teeth of the lever from coming in contact with the rack bar while said bar is descending, as will be evident from the drawing.

I do not claim the oblong slot separately, for the purpose of allowing the lever to be adjusted, so as to let the bar fall, but,

What I claim as my invention, and desire to secure by Letters Patent, is:—

The curved oblong slots, D, in combination with the double acting pawl, G, and tooth, $b$, on the lever, E, so that the lever may be adjusted as described, and after being adjusted, prevented from again falling and coming in contact with the rack bar, before it has entirely descended, substantially as set forth.

F. B. SMITH.

Witnesses:
   CHARLES J. GREGG,
   G. C. DURNO.